(12) United States Patent
Wymer

(10) Patent No.: US 8,997,696 B1
(45) Date of Patent: Apr. 7, 2015

(54) PET DETERRENT

(71) Applicant: Robert A. Wymer, Pahrump, NV (US)

(72) Inventor: Robert A. Wymer, Pahrump, NV (US)

( * ) Notice: Subject to any disclaimer, the term of this patent is extended or adjusted under 35 U.S.C. 154(b) by 267 days.

(21) Appl. No.: 13/788,150

(22) Filed: Mar. 7, 2013

(51) Int. Cl.
*A01K 15/02* (2006.01)
*A01M 23/30* (2006.01)
*A01M 29/00* (2011.01)

(52) U.S. Cl.
CPC ..................... *A01M 29/00* (2013.01)

(58) Field of Classification Search
CPC ....... A01K 15/02; A01M 23/30; A01M 29/00
USPC ................. 119/712; 43/81, 81.5, 82, 83, 83.5
See application file for complete search history.

(56) References Cited

U.S. PATENT DOCUMENTS

| 1,429,189 | A | * | 9/1922 | Chasse | 43/81 |
| 1,491,829 | A | * | 4/1924 | Stoeffler | 43/81 |
| 2,144,956 | A | * | 1/1939 | Arndt | 43/81 |
| 2,462,479 | A | * | 2/1949 | Elleby | 43/81 |
| 2,581,628 | A | * | 1/1952 | Burwell | 43/81 |
| 2,610,431 | A | * | 9/1952 | Osborn et al. | 43/81 |
| 3,157,000 | A |   | 11/1964 | Stavig |  |
| 3,990,177 | A |   | 11/1976 | Daraux |  |
| D275,511 | S |   | 9/1984 | Nagel |  |
| 4,779,374 | A | * | 10/1988 | Feldman | 43/81 |
| 5,024,183 | A | * | 6/1991 | Baer | 119/712 |
| 5,103,769 | A |   | 4/1992 | Macintosh |  |
| 5,375,367 | A | * | 12/1994 | Pust | 43/81 |

* cited by examiner

*Primary Examiner* — Monica Williams
(74) *Attorney, Agent, or Firm* — Robert C. Montgomery; Montgomery Patent & Design

(57) ABSTRACT

A deterrent device which discourages pets from climbing on furniture, or stealing food from countertops or tables, is set using a spring release arm connected to a large trip plate. Once the deterrent device is tripped, a large padded arm will swing up and over the trip plate. The force of the padded arm is very low and will not cause damage or pain. The deterrent device can be reset upon tripping and is preferably used to train an animal to avoid certain areas.

20 Claims, 4 Drawing Sheets

PET DETERRENT

RELATED APPLICATIONS

There are no current co-pending applications.

FIELD OF THE INVENTION

The presently disclosed subject matter is directed to pet deterrent devices. More particularly, the present invention relates to pet deterrent devices having spring release arms and a trip plate.

BACKGROUND OF THE INVENTION

Millions of Americans keep pets such as dogs and cats. It is well-known that some pet owners treat their pets like members of the family. Indeed, for many Americans their pets are the only family members they have.

Pets often have access to all areas of a home, including the furniture. While some pets are allowed access to furniture, others are not. In addition some pets may be allowed access to certain pieces of furniture but not others. A cat may be allowed access to a sofa but not a good leather chair. At times some pets are confined to or are kept out of certain rooms. All of these furniture access rules can be very difficult for a pet to learn and aggravating for owners to teach.

Accordingly, there exists a need for a means by which a pet can be easily taught to avoid certain pieces of furniture or certain areas of a home in a manner which addresses the above problems. Preferably such a device would be useable for training cats, dogs, and similar pets on the allowable uses of furniture, doorways, and rooms. Such a device must not be harmful to a pet, but nonetheless must be effective in training pets on proper access to furniture and areas of the home, in reinforcing such training, and in breaking bad habits.

SUMMARY OF THE INVENTION

The principles of the present invention provide for an apparatus designed to discourage pets from climbing on furniture or accessing certain areas of a home.

A pet deterrent device that is in accord with the present invention includes a base, a platform frame having a trigger side having a generally vertical crank, an actuating platform attached to the platform frame, a first anchoring mechanism rotatably attaching the platform frame to the base, and a biased arm frame having a proximal arm and a distal arm. The pet deterrent device further includes a second anchoring mechanism that rotatably attaches the proximal arm to the base such that the distal arm can rotate against the bias forces and, and a trigger mechanism having a mechanical stop and a trigger rod that is attached to the crank. The trigger rod can pass through the mechanical stop and over the distal arm when the distal arm is rotated against the bias. When the platform frame is forced down the trigger rod releases the distal arm which enables the distal arm to rotate.

In practice the arm frame is at least partially padded and the actuating platform is attached to the platform frame by a plurality of clips. Beneficially those clips are integrally-molded as part of the actuating platform. The clips enable removing the actuating platform from the platform frame.

Preferably the platform frame is formed from a bent rod while the trigger side is located at about the middle of the base. The first anchoring mechanism may include two (2) "U"-shaped fasteners having ends embedded into the base and entrapping the trigger side, while the vertical crank preferably has an inverted "U"-shape. Bias forces can be supplied by a torsion spring.

An alternative pet deterrent device is similar. That alternative embodiment has a flat base, a metal platform frame having a trigger side with a generally inverted "U"-shaped crank, and a flat plastic actuating platform attached to the platform frame. A first anchoring mechanism rotatably attaches the platform frame to the base. That first anchoring mechanism includes an inverted "U"-shaped fastener that captures the trigger side and retains it in place adjacent the base. The alternative pet deterrent device further includes a spring-biased arm frame having a proximal arm and a distal arm. A second anchoring mechanism rotatably attaches the proximal arm to the base such that the proximal arm is adjacent to and parallel with the trigger side and such that the distal arm can rotate against the bias. The alternative pet deterrent device further includes a trigger mechanism having a mechanical stop and a trigger rod that is attached to the crank by a closed eyelet. The trigger rod can pass through the mechanical stop and over the distal arm when the distal arm is rotated against the bias. The trigger rod releases the distal arm when the platform frame is forced down, which enables the distal arm to rotate.

Still referring to the alternative pet deterrent device, in practice the arm frame is at least partially padded and the actuating platform is attached to the platform frame by a plurality of clips. Beneficially those clips are integrally-molded as part of the actuating platform. The clips enable removing the actuating platform from the platform frame.

Preferably the platform frame is formed from a bent metal rod while the trigger side is located at about the middle of the base. The first anchoring mechanism may include two (2) "U"-shaped fasteners having ends embedded into the base and entrapping the trigger side. Bias forces can be applied by a torsion spring.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
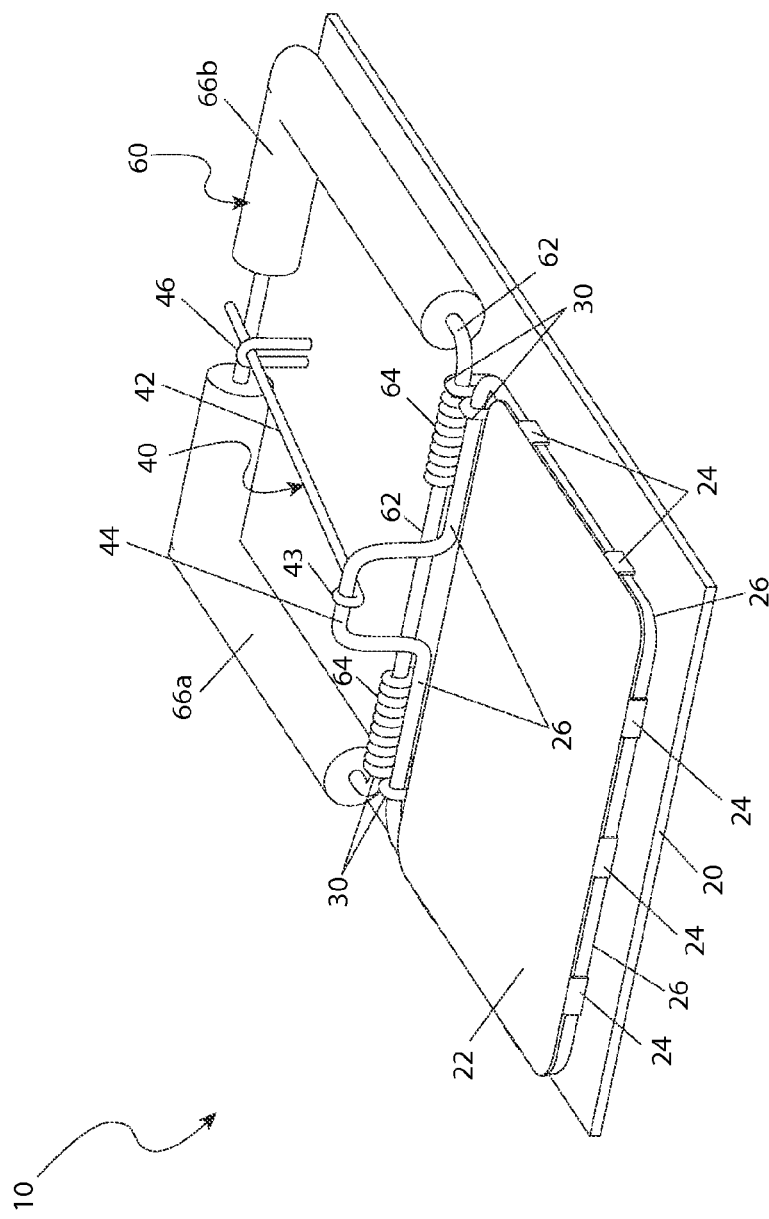
FIG. 1 is a front perspective view of a deterrent device 10 that is in accord with a preferred embodiment of the present invention.

DESCRIPTIVE KEY 10 deterrent device
20 base
22 actuating platform
24 clip
26 platform frame
30 first anchor
40 trigger mechanism
42 trigger rod
43 eyelet
44 crank section
46 second anchor 60 padded arm
62 padded arm frame
64 spring
66a first pad
66b second pad
100 furniture item
105 cushion
110 animal

DETAILED DESCRIPTION OF THE PREFERRED EMBODIMENT

Figure 2A:
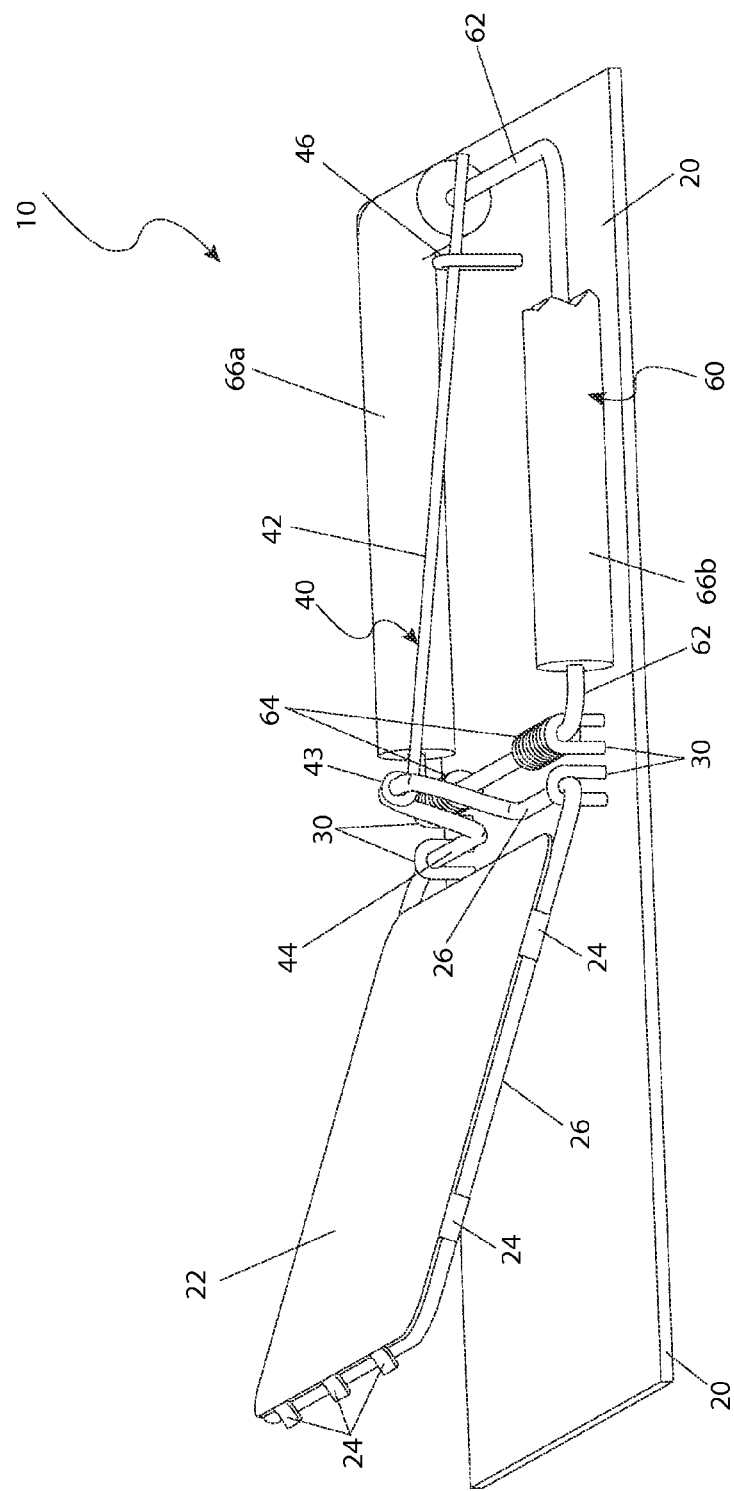
FIG. 2a is a side perspective view of the deterrent device 10 shown in FIG. 1 depicting a "ready" state.
Figure 2B:
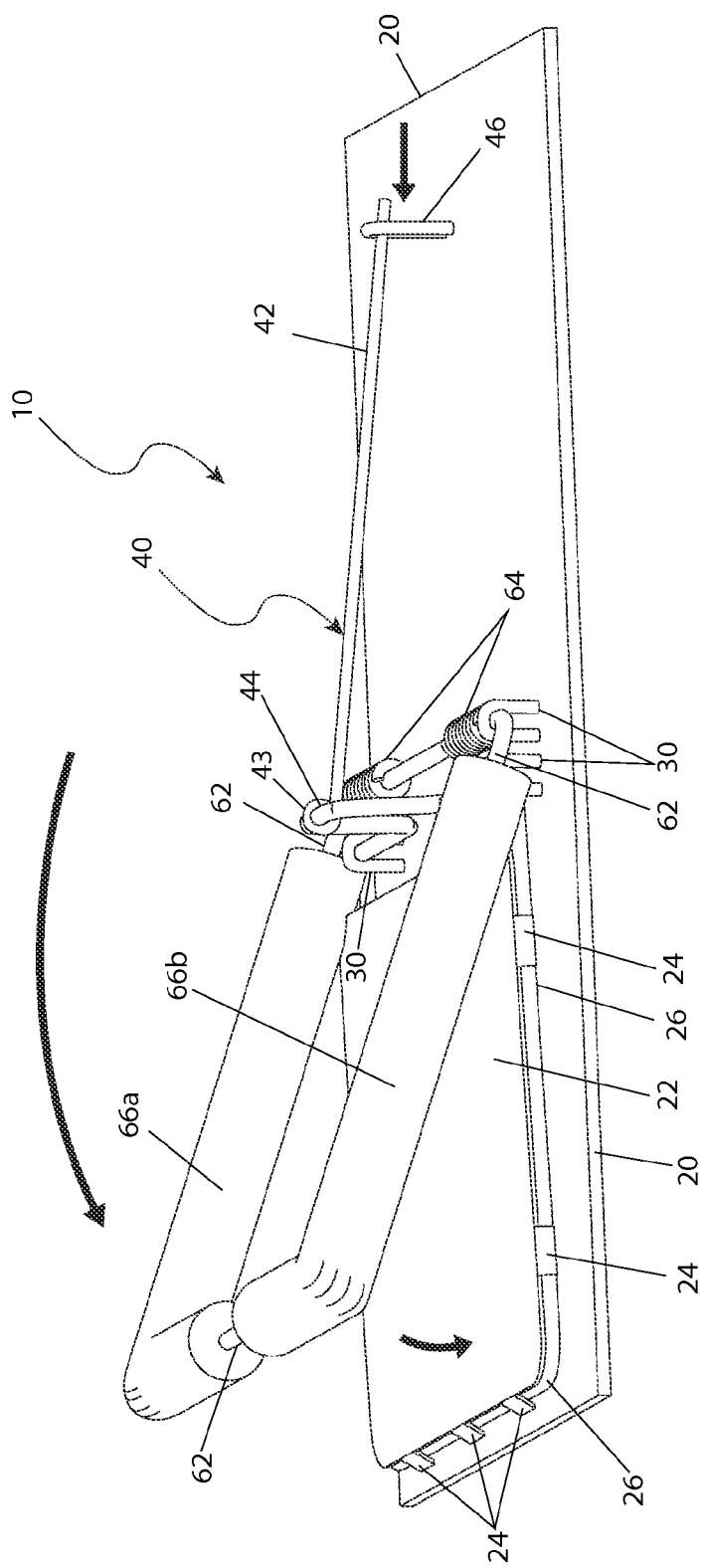
FIG. 2b is a side perspective view of the deterrent device 10 shown in FIGS. 1 and 2a depicting an "activated" state; and, FIG. 3 is an environmental view of the deterrent device 10 shown in FIGS. 1-2b depicting an in-use state.
Figure 3:
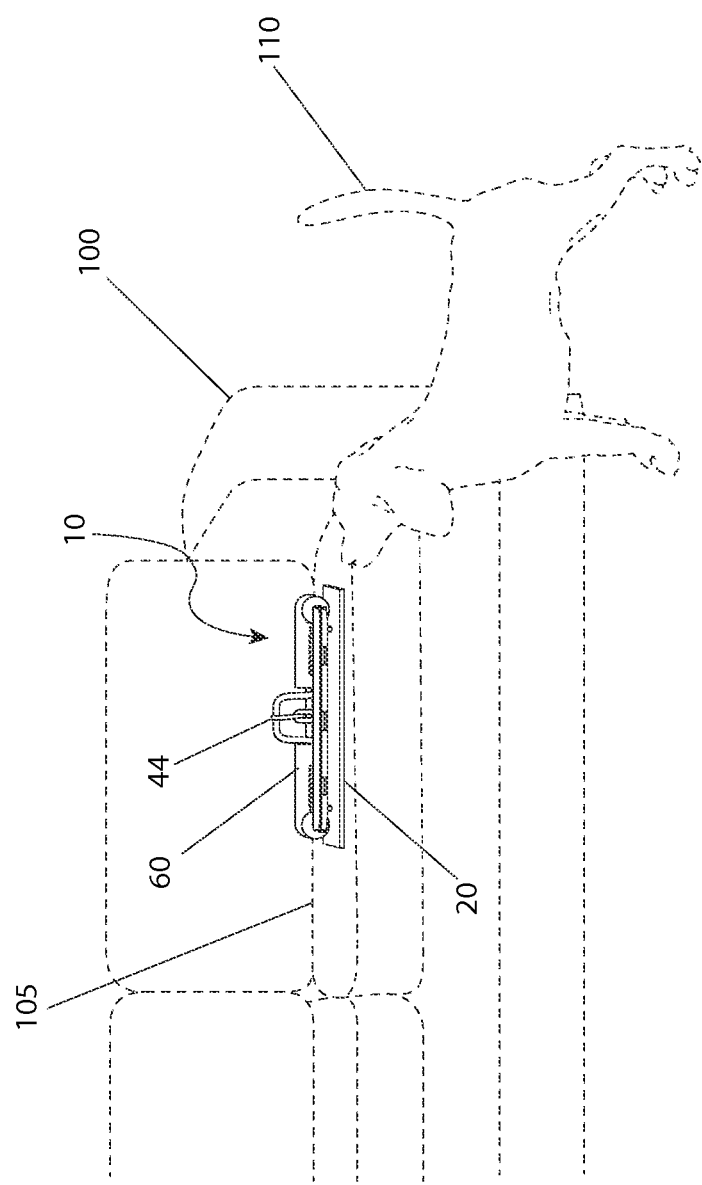

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a pet deterrent device (herein described as the "apparatus") 10 that is well-suited to discourage animals 110 from climbing on furniture 100 or accessing certain areas of a home. The apparatus 10 is mostly intended to frighten an animal 110. However should the animal 110 step upon or otherwise contact the apparatus 10 a large padded arm 60 will swing toward and contacting the animal 110 with a force insufficient to harm the animal 110 but sufficient to focus their attention. While the apparatus 10 can be used at any of a variety of restricted surfaces and areas, it is viewed as being especially useful around and upon furniture 100 such as cushions 105.

Referring now to FIG. 1, a front perspective view of the apparatus 10, the apparatus 10 includes a flat rectangular plastic or wood base 20 that is approximately seven inches (7 in.) wide by eight inches (8 in.) in length. The base 20 supports a large actuating platform 22, a platform frame 26, a trigger mechanism 40, and a spring-loaded padded arm 60.

Referring now to FIGS. 1 and 2, the actuating platform 22 comprises a flat section of extruded or molded plastic that is beneficially about six inches (6 in.) wide and three inches (3 in.) in length. The actuating platform 22 overlays three sides of a four (4) sided platform frame 26. The platform frame 26 extends near the perimeter of the actuating platform 22 and is affixed to the actuating platform 22 by plurality of downwardly curving clips 24. Preferably the clips 24 are integrally-molded as part of the actuating platform 22. The clips 24 enable easy removal of the actuating platform 22 from the platform frame 26 for cleaning.

The fourth side of the platform frame 26 is a trigger side that extends past the actuating platform 22 and is formed into a side having a central, generally vertical inverted "U"-shaped crank 44. The platform frame 26 is envisioned as being a continuous metal rod formed into the required shape. The fourth side is positioned at about the middle of the base 20 where it is then anchored to the base 20 in a pivoting manner. Anchoring is performed using a pair of first anchors 30, each located near where the fourth side bends inward from another side. The first anchors 30 are inverted "U"-shaped fasteners having end embedded into the base 20 and the "U" entrapping the platform frame 26 within. This mounting allows the actuating platform 22 to pivot upward.

Still referring to FIGS. 1 and 2, the padded arm 60 includes a four-sided metal arm frame 62 that is beneficially made of the same materials as the platform frame 26. One (1) side of the padded arm frame 62 is a pivot side that is located adjacent to and generally parallel with the platform frame 26 side that is attached to the base 20 by the first anchors 30. That arm of the padded arm frame 62 is affixed to the base 20 using a pair of first anchors 30. Within that arm of the padded arm frame 62 are a pair of entrapped torsion springs 64.

The torsion springs 64 apply a torque to the remainder of the padded arm frame 62 to bias the padded arm 60 toward the actuating platform 22. The padded arm 60 includes a soft cylinder-shaped urethane foam pad (or equivalent covering material) that extends partially or fully over the other three (3) sides of the padded arm frame 62. That padding takes the form of a first pad 66a and a second pad 66b that are minor-image "L"-shapes. The padded arm frame 62 legs are centered within the first pad 66a and second pad 66b. However, the side of the padded arm frame 62 opposite the side attached to the base 20 is partially exposed between the first pad 66a and second pad 66b. The exposed section engages a trigger rod 42 of the trigger mechanism 40.

As previously noted the anchored side of the platform frame 26 further includes the "U"-shaped crank section 44. The crank section 44 is in mechanical communication with the padded arm 60 via the trigger rod 42 and by a second anchor 46 that is anchored to the base 20. The crank section 44 supports a rotating attachment of the trigger rod 42 via an integral eyelet 43 of the trigger rod 42. When the platform frame 26 is raised the opposite end of the trigger rod 42 can pass through the second anchor 46. However, when the platform frame 36 is lowered the crank section 44 pulls on the eyelet 43 which pulls the end of the trigger rod 42 out of the second anchor 46.

Still referring primarily to FIGS. 1 and 2, when the padded arm frame 62 is pushed against the base 20 the torsion springs 64 are maximally extended. When the platform frame 26 is raised, the end of the trigger rod 42 can extend over the padded arm frame 62. Because of the mechanical stop imposed on the end of the trigger rod 42 by the second anchor 46 the padded arm frame 62 becomes trapped between the base 20 and the trigger rod 42. This establishes the "ready" state (see FIG. 2a) of the apparatus 10. The extended and retracted positions of the trigger rod 42 provide respective engagement and disengagement of the padded arm frame 62, thereby resulting in respective "ready" and "activated" states of the apparatus 10 (see FIGS. 2a and 2b).

Refer now to FIGS. 2a and 2b, respectively side perspective views of the apparatus 10 depicting the "ready" and "activated" states. In use the apparatus 10 is prepared in the "ready" state by pushing the padded arm 60 down and then securing the padded arm 60 in position. Securing the position is achieved by moving the end of the trigger rod 42 over the padded arm frame 62 between the pads 66a, 66b. The bias imparted by the torsion springs 64 on the trigger rod 42 and the second anchor 46 locks the padded arm frame 62 in position.

However, when an animal 110 steps on the actuator platform 22 the actuator platform 22 pivots downward. This rotates the crank section 44 away from the second anchor 46. This retracts the trigger rod 42 which the padded arm 60. The padded arm 60 then pivots toward the actuating platform 22 due to forces applied to the padded arm frame 62 by the torsion springs 64. In practice the padded arm 60 strikes and/or frightening the animal 110.

FIG. 3 presents an environmental view of the apparatus 10. The apparatus 10 is illustrated as being placed upon a cushion 105 of furniture 100. This is performed with the intention of training an animal 110 to stay off the furniture 100. Of course the apparatus 10 may be used to train animals 110 to stay off of or away from various items of furniture 100 and/or areas otherwise deemed "off-limits" for the animal 110.

It is envisioned that other styles and configurations of the present invention can be easily incorporated into the teachings of the present invention. While only one particular configuration is shown and described that is for purposes of clarity and disclosure and not by way of limitation of scope.

The preferred embodiment of the present invention can be used by the common user in a simple and effortless manner with little or no training. After initial purchase or acquisition of the apparatus 10 it would be installed as generally indicated in FIG. 3. That is, the apparatus 10 would be placed where it would reduce or eliminate the incidence of animals 110 being where they are not wanted. The method of installing and utilizing the apparatus 10 may be achieved by procuring a model of the apparatus 10 suitable for an animal 110 to be trained; setting up the apparatus 10 in a "ready" state by moving the padded arm 60 downward against the base 20; tilting the actuating platform 22 upward to extend and position the trigger rod 42 over the padded arm frame 62; releasing the padded arm 60; placing the apparatus 10 upon furniture 100 or other area considered "off-limits" for the animal 110; activating the apparatus 10, waiting for an animal 110 to retract the trigger rod 42 by stepping on the actuating platform 22 to retract and release the padded arm 60; scaring or gently striking the animal 110 with the pads 66*a*, 66*b* when the trigger rod 42 is released; repeating the above procedure until such time that the animal 110 is cured of its bad habit; and, benefiting from deterring of an animal 110 from occupying furniture 100, or other "off limits" areas afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A pet deterrent device, comprising:
a base;
a platform frame having a trigger side with a generally vertical crank;
an actuating platform attached to said platform frame;
a first anchoring mechanism rotatably attaching said platform frame to said base;
a biased arm frame having a proximal arm and a distal arm;
a second anchoring mechanism rotatably attaching said proximal arm to said base such that said distal arm can be rotated against said bias; and,
a trigger mechanism comprising a mechanical stop and a trigger rod attached to said crank;
wherein said trigger rod can pass through said mechanical stop and over said distal arm when said distal arm is rotated against said bias;
wherein said trigger rod is released through the mechanical stop when said platform frame is forced down, releasing said distal arm; and,
wherein said bias causes said released distal arm to rotate.

2. The pet deterrent device according to claim 1, wherein said arm frame is at least partially padded.

3. The pet deterrent device according to claim 1, wherein said actuating platform is attached to said platform frame by a plurality of clips.

4. The pet deterrent device according to claim 3, wherein said plurality of clips is integrally-molded with said actuating platform.

5. The pet deterrent device according to claim 1, wherein said actuating platform is removable from said platform frame.

6. The pet deterrent device according to claim 1, wherein said platform frame is formed from a bent rod.

7. The pet deterrent device according to claim 1, wherein said trigger side is located adjacent the middle of said base.

8. The pet deterrent device according to claim 1, wherein said first anchoring mechanism includes two "U"-shaped fasteners having ends embedded into the base and entrapping said trigger side.

9. The pet deterrent device according to claim 1, wherein said vertical crank comprises an inverted "U"-shape.

10. The pet deterrent device according to claim 1, wherein said bias is formed by a torsion spring.

11. A pet deterrent device, comprising:
a flat base;
a metal platform frame having a trigger side with a generally vertical "U" shaped crank;
a flat plastic actuating platform attached to said platform frame;
a first anchoring mechanism rotatably attaching said platform frame to said base, said first anchoring mechanism including an inverted "U" shaped fastener capturing said trigger side and retaining said trigger side adjacent said base;
a spring biased arm frame having a proximal arm and a distal arm; a second anchoring mechanism rotatably attaching said proximal arm to said base such that said proximal arm is adjacent to and parallel with said trigger side and said distal arm can be rotated against said bias; and,
a trigger mechanism comprising a mechanical stop and a trigger rod attached to said crank with a closed eyelet;
wherein said trigger rod can pass through said mechanical stop and over said distal arm when said distal arm is rotated against said bias;
wherein said trigger rod is released through the mechanical stop when said platform frame is forced down, releasing said distal arm; and,
wherein said bias causes said released distal arm to rotate.

12. The pet deterrent device according to claim 10, wherein said arm frame is at least partially padded.

13. The pet deterrent device according to claim 10, wherein said actuating platform is attached to said platform frame by a plurality of clips.

14. The pet deterrent device according to claim 13, wherein said plurality of clips is integrally-molded with said actuating platform.

15. The pet deterrent device according to claim 10, wherein said actuating platform is removable from said platform frame.

16. The pet deterrent device according to claim 10, wherein said platform frame is formed from a bent rod.

17. The pet deterrent device according to claim 10, wherein said trigger side is located adjacent the middle of said base.

18. The pet deterrent device according to claim 10, wherein said first anchoring mechanism includes two "U"-shaped fasteners having ends embedded into the base and entrapping said trigger side.

19. The pet deterrent device according to claim 10, wherein said vertical crank is substantially vertical.

20. The pet deterrent device according to claim 10, wherein said spring is a torsion spring.

* * * * *